Patented Jan. 28, 1941

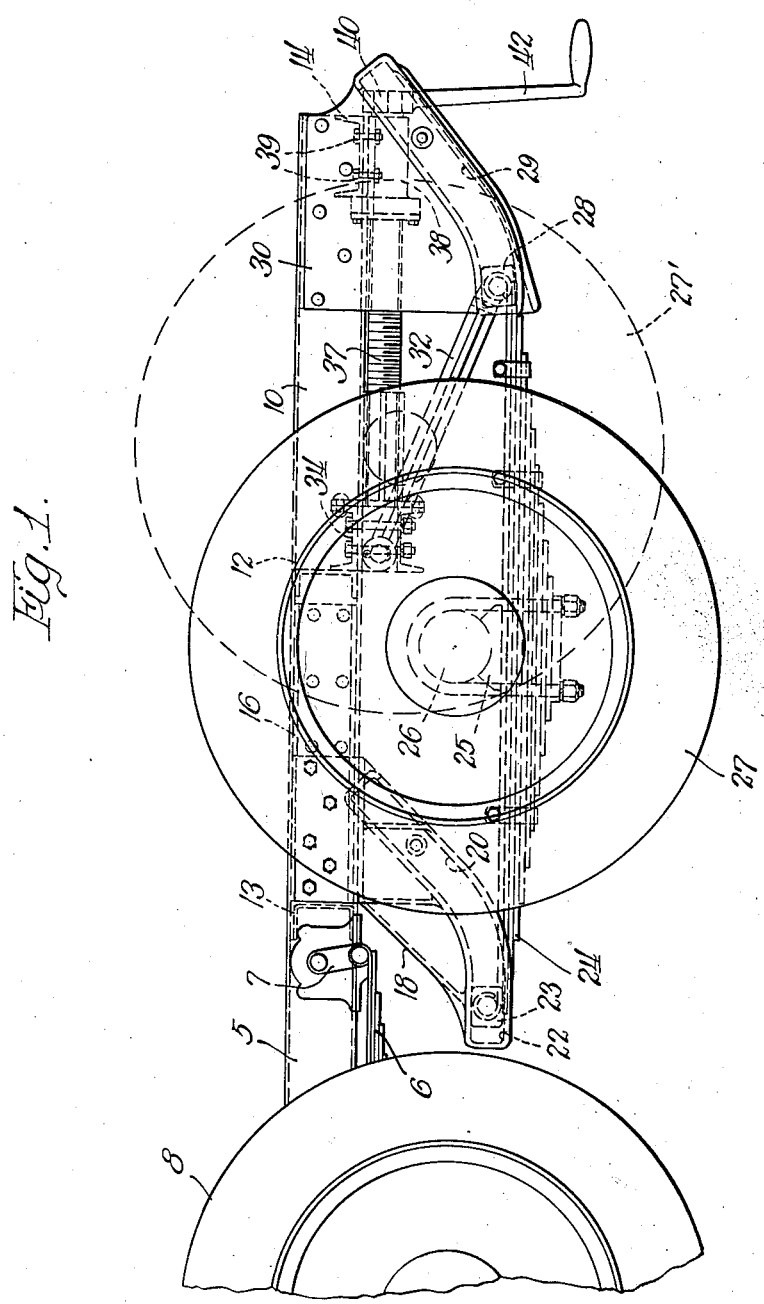

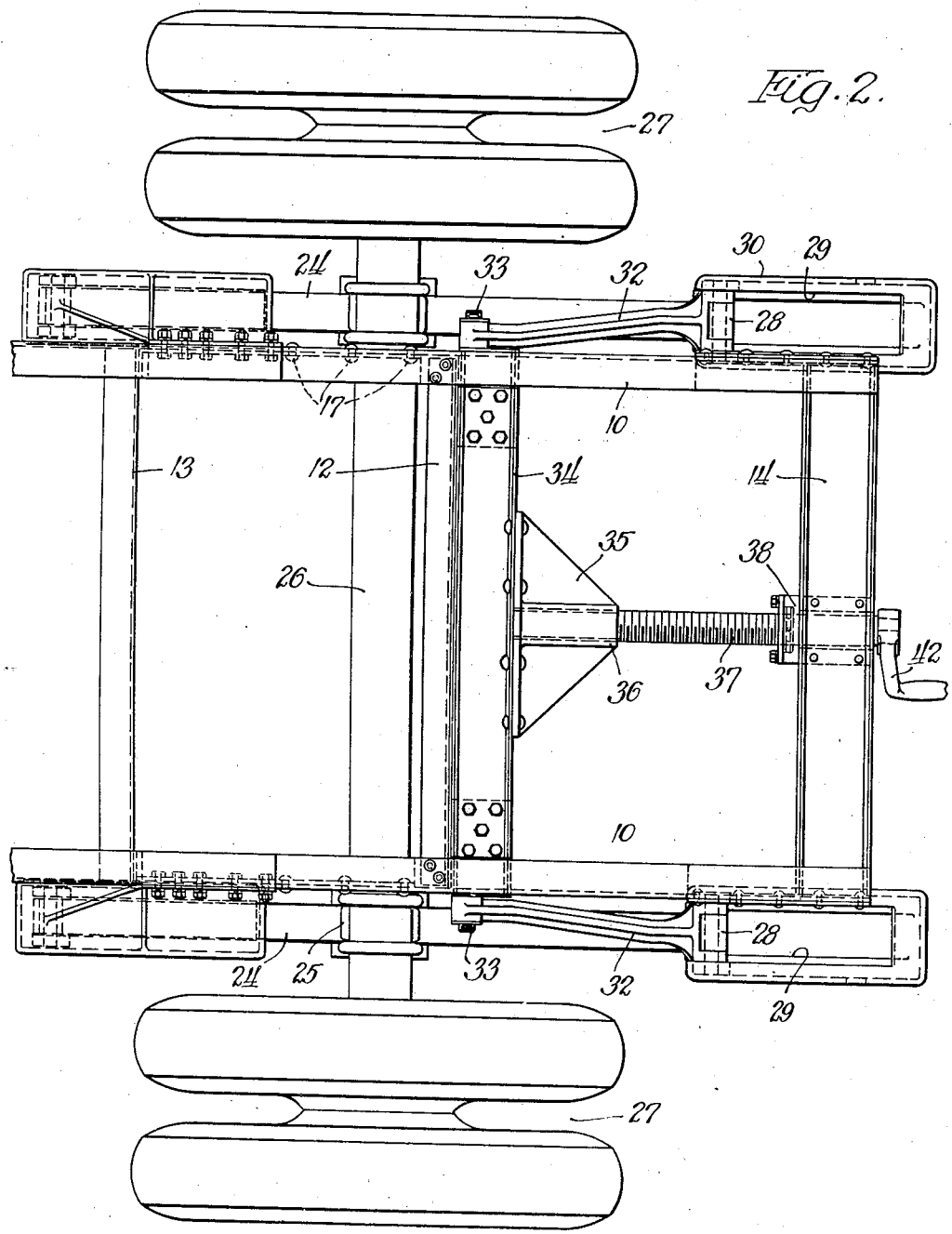

2,229,723

UNITED STATES PATENT OFFICE 2,229,723

AXLE ASSEMBLY

Frederick W. Burger, Niles, Robert E. Burrus, Buchanan, and George D. Wilcox, Detroit, Mich.; said Burger and said Burrus assignors to Clark Equipment Company, Buchanan, Mich., a corporation of Michigan Application August 5, 1939, Serial No. 288,568

11 Claims. (Cl. 280—124)

This invention relates to axle assemblies, and more particularly is directed to an axle construction to be utilized as an additional load supporting means when a vehicle, such as a truck or the like, is over-loaded, but which can be raised from ground engaging position so as to save wear thereon when the truck is unloaded.

Such constructions find particular utility in the Western and Southern part of the country for hauling materials, lumber and the like, where there is a number of trips made with the load being only carried one way and the truck returning empty, or substantially so. Under such conditions, heavier loads can be hauled by providing such an auxiliary axle assembly, since many states now have requirements limiting the load per axle and therefore limiting the total load that can be carried on a truck materially compared to the load that can be carried when an additional axle is provided.

At the same time, it is not desired that the wear incident to the use of such an axle be produced when it is not essential that the axle be in ground-engaging position, and therefore the present invention contemplates an arrangement such that the auxiliary axle can be raised out of ground engaging position so as to clear the road and therefore impose no wear on such auxiliary axle during the time that it is in raised position.

We have found that if an axle can be raised approximately six inches away from the ground there is little likelihood of it ever having any contact with the ground regardless of the road construction, and consequently the present axle has been designed so as to be raised at least this amount.

Another feature resulting from the present construction is the fact that when heavy traction is desired, the trailing axle or auxiliary axle can be raised slightly so that additional traction can be imposed upon the drive wheels of the truck in order to move the load. This is especially desirable when a muddy or icy road is encountered.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 1 is a side elevational view of the auxiliary axle assembly of the present invention; and Figure 2 is a top plan view of the structure shown in Figure 1.

In Figure 1 the rear portion of a truck chassis is shown, the chassis having the conventional side rail channels 5 which are supported by means of the springs 6 carried in the shackles 7 upon a driving axle assembly indicated generally at 8. Secured to the rear ends of the channels 5 are extension channels 10 which extend the chassis of the vehicle rearwardly and thus provide for a longer body being mounted thereon. The extension channels 10 are suitably cross braced by means of the cross members 12, 13 and 14 to provide rigid spacing means therebetween, the channels preferably being telescoped partially over intermediate channel members 16 which telescope into the ends of the channels 5 to provide a rigid connection therebetween, this connection being secured together by means of rivets 17.

Mounted intermediate the cross frame members 12 and 13 are suitable depending bracket members 18 which are bolted or otherwise secured through the channels 16 and 5 in rigid position, and which have laterally offset downwardly depending portions including upwardly curved trackways 20 which terminate at their lower ends in horizontally extending track portions 22. Mounted in the channel-shaped trackways 20 are block members 23 secured to the ends of a leaf spring assembly 24 which, at its center is secured to the spring pad 25 carried by the dead axle 26, upon which is mounted the dual wheel assemblies 27 whereby the forward end of the auxiliary axle assembly is spring supported within the tracks 20 at opposite sides of the vehicle frame.

The opposite ends of the spring assembly 24 are provided with blocks 28 which are engaged in corresponding trackways 29 carried by suitable depending bracket members 30 riveted or otherwise suitably fixed to the rear ends of the extension channels 10. It will thus be seen that when the axle is in lowered position, as shown in full lines in Figure 1, the opposite ends of each of the spring assemblies 24 are engaged in the lower portions of the respective portions of the trackways 20 and 29, and are held against movement therein by means of radius arms 32 which, at their upper ends are pivotally secured to stub shafts 33 carried by a cross member 34 extending beneath and guided for movement longitudinally of the frame of the vehicle upon the lower flanges of the channels 10. Intermediate its ends the frame member 34 has a rearwardly extending portion 35 provided with a box 36 adapted to receive the threaded shaft 37 extending thereto. The shaft 37 is suitably journalled at its opposite end in a journal housing 38 secured to the under surface of the cross member 14 by means of the bolts 39 shown in Figures 1 and 2. A portion of the shaft 37 extends through the journal housing 38, and at its projecting end is provided with a flattened or squared portion 40 adapted to receive a crank 42 or similar actuating means, whereby rotation of the crank 42 results in threading the shaft with respect to the bracket 35 to move the member 34 rearwardly from the position shown.

This rearward movement results in the radius arms 32 forcing the rear ends 28 of the spring assemblies rearwardly and upwardly in the tracks 29, whereby the entire spring assembly is moved rearwardly and upwardly, the forward ends of such assembly rising upwardly in the tracks 20 of the bracket members 18. The crank 42 can be rotated to thread the bracket 35 to a rearward position such that the entire axle and wheel assembly is raised to the dotted line position shown at 27 in Figure 1, or can be raised to any intermediate position and locked in such intermediate position since the pitch of the threads 37 can be made so that the mechanism is self-locking, or otherwise, lock means for preventing the rotation of the shaft 37 can be provided.

It will be noted that when the arms 32 are in the position shown in full lines in Figure 1, they effectively prevent any lateral or vertical movement of the spring assemblies, and since the two arms are cross connected through a rigid cross frame member 34 and are angled slightly outwardly, there is no possibility of the axle 26 cocking in a transverse direction relative to the longitudinal extent of the frame. It will be noted that there is a small amount of space between the blocks 23 at the forward ends of the spring assembly 24 and the forward end of the track portion 22. This space provides for extension of the spring assembly during flexing so that the spring is free to carry the load, and any extension thereof caused by deflection will be accommodated due to this clearance provided in the forward brackets 18.

It is believed apparent that the present construction can be applied to any truck or trailer now in use, or can be manufactured as a standardized accessory for sale to those individuals desiring the load-carrying capacities of an additional axle and yet wanting economy in the operation of their truck.

We are aware that many changes may be made in certain details of the invention herein shown and described, and we therefore do not intend to be limited except as defined by the scope and spirit of the appended claims.

We claim:

1. An axle assembly for a vehicle comprising a pair of parallel side frame members, a pair of longitudinally spaced brackets on each member in transverse alinement, said brackets having rearwardly and upwardly inclined trackways, a dead axle extending transversely beneath said frame member, longitudinal leaf springs adjacent each end of said axle and having the ends thereof supported in said trackways, and means for moving said ends in said trackways to raise and lower said axle relative to said frame members.

2. An axle assembly for a vehicle comprising parallel side frame members, a transverse axle therebeneath, longitudinal spring means carried by said axle, supporting means on said frame member receiving the opposite ends of said spring means and including means guiding the same for movement rearwardly and upwardly to move said axle from operative position to raised inoperative position, and means carried by said frame members and connected to corresponding ends of each of said spring means for moving the same in said guide means.

3. An axle assembly for a truck frame having a conventional driving axle, comprising an auxiliary trailing axle, spring means therefor, means on said frame supporting said spring means and including rearwardly and upwardly inclined trackways for the opposite ends of said spring means, arms rigidly connected to one end of each of said spring means, and means on said frame for conjointly moving said arms rearwardly to raise said trailing axle relative to said frame.

4. In a vehicle frame, a pair of side rails, a rear driving axle therebeneath, a frame extension extending rearwardly of the ends of said rails, brackets mounted on said extension and having upwardly and rearwardly inclined trackways, a dead axle, springs carried thereby and having their ends supported in said trackways, and means for moving said spring ends along said trackways to raise and lower said dead axle.

5. A vehicle including a frame, a driving axle therefor, pairs of longitudinally spaced brackets mounted on said frame rearwardly of said axle, a dead axle, longitudinally extending springs adjacent opposite ends of said dead axle, rearwardly and upwardly inclined trackways in said brackets, means at the ends of said springs supporting them for movement in said trackways, and means carried by said frame, intermediate said trackways and longitudinally movable in said frame for moving said spring supporting means in said trackways.

6. A trailing axle assembly for a vehicle having longitudinally extending frame members, comprising pairs of spaced brackets on each frame member having upwardly and rearwardly inclined trackways, a transverse dead axle having springs extending beneath each frame member, means for mounting the ends of said springs for movement in said trackways, and means including a worm shaft, a transverse plate movable longitudinally of said frame members by said shaft, and arms carried by said plate engaging certain of said spring ends for moving said assembly in said trackways.

7. In combination, a vehicle frame having longitudinal extensions secured to the rear ends of the side frame members thereof, a transverse axle beneath said extensions, spring means secured intermediate their ends to said axle and paralleling said extensions, supporting means secured to said extensions for receiving the opposite ends of said spring means and including guide means for said ends for effecting raising movement of said spring means upon rearward movement thereof, and means connected to the spring means for moving them rearwardly relative to said extensions.

8. The combination, with a vehicle frame having rearward extensions of the side frame members, of spaced pairs of depending brackets secured to said extensions, an axle beneath said extensions having spring means, inclined trackways in said brackets receiving the opposite ends of said spring means, and means between said extensions and pivotally connected to one end of said spring means for conjointly moving the ends of spring means in said trackways.

9. The combination of claim 8 wherein certain of said trackways have horizontal portions accommodating flexing of said spring means.

10. The combination, with a vehicle frame having laterally spaced longitudinal channel side rails, and a driving axle resiliently supporting the rear end of said frame, of a frame extension secured to the rear ends of said rails, transversely alined depending brackets disposed in longitudinally spaced relation on said extension including rearwardly and upwardly inclined trackways, a transversely extending dead axle beneath said extension, longitudinal spring means secured intermediate their ends to said dead axle adjacent the ends thereof, means at the opposite ends of said spring means received in said trackways, means disposed for longitudinal movement in said frame extension connected to said spring means, and means operable from the end of said extension for moving said last-named means.

11. A frame extension for the rear end of a vehicle frame, comprising a pair of parallel laterally spaced frame members, a pair of longitudinally spaced brackets on each member defining rearwardly and upwardly inclined trackways, a transverse dead axle beneath said members, longitudinal spring means adjacent opposite ends of said axle having means at the ends thereof guided for movement in said trackways, a transverse plate between said members, a threaded sleeve extending from said plate, a threaded shaft in said sleeve extending outwardly of the rear end of said extension, rigid connections between said plate and spring means, and means for rotating said shaft to move said plate longitudinally to raise and lower said axle.

FREDERICK W. BURGER.
ROBERT E. BURRUS.
GEO. D. WILCOX.